United States Patent [19]
Munck

[11] Patent Number: 6,098,456
[45] Date of Patent: Aug. 8, 2000

[54] ANTI-FRAUD LIQUID METERS HAVING A DRIVE AND DRIVEN MAGNETS WITH DOUBLE POLARITY FACES

[75] Inventor: Christophe Munck, Saint-Louis, France

[73] Assignee: Societe Anonyme de Production de Procedes de Comptage de l'Eau et Autres Liquides, SAPPEL, Saint-Louis, France

[21] Appl. No.: 09/073,260

[22] Filed: May 6, 1998

[30] Foreign Application Priority Data

| May 6, 1997 | [FR] | France | 97 05556 |
| Jul. 10, 1997 | [FR] | France | 97 08788 |

[51] Int. Cl.[7] ............... G01F 15/00; G01F 1/11
[52] U.S. Cl. .......... 73/275; 73/861.93; 73/861.94
[58] Field of Search ........ 73/273, 275, 861.79, 73/861.93, 861.94, 861.77

[56] References Cited

U.S. PATENT DOCUMENTS

| 2,915,606 | 12/1959 | Knauth . | |
| 3,295,370 | 1/1967 | Marx | 73/861.94 |
| 3,781,661 | 12/1973 | Trikilis | 324/34 |
| 3,811,323 | 5/1974 | Swenson | 73/861.94 |
| 3,893,059 | 7/1975 | Nowak | 338/32 |
| 3,969,644 | 7/1976 | Nowak | 310/152 |
| 4,489,600 | 12/1984 | Han | 73/275 |
| 5,493,917 | 2/1996 | Clanin . | |

FOREIGN PATENT DOCUMENTS

| 2 263 496 | 10/1975 | France . |
| 2 280 060 | 2/1976 | France . |
| 2 343 231 | 9/1977 | France . |

Primary Examiner—Harshad Patel
Attorney, Agent, or Firm—Young & Thompson

[57] ABSTRACT

A liquid meter includes a housing with two compartments with respectively a motor member disposed in the path of movement of a stream of the liquid to be measured and a counter, the transmission of the movement of the motor member to the counter being carried out through the separation wall of the compartments with the aid of a magnetic drive device having a pair of magnets, the first magnet associated with the motor member having a face with double polarity in magnetic equilibrium with a face of double polarity of the magnet associated with the counter, each magnet has at least one double polarity on each of its other faces.

12 Claims, 3 Drawing Sheets

ANTI-FRAUD LIQUID METERS HAVING A DRIVE AND DRIVEN MAGNETS WITH DOUBLE POLARITY FACES

This application corresponds to French application 97 05556 of May 6, 1997, and French application 97 08788 of Jul. 10, 1997, the disclosures of which are incorporated herein by reference.

BACKGROUND OF THE INVENTION

The present invention relates to an anti-fraud liquid meter.

DESCRIPTION OF THE RELATED ART

Liquid meters and, more particularly, water meters, comprise a motor member such as a turbine, a helix or a piston which, disposed in the path of movement of the liquid flow to be measured, transmits its movement to a counter which, by demultiplication of a gear train, actuates an indicator, generally comprised by numerical drums, also called an ogometer.

The counter is conventionally located in a sealed compartment of the housing of the meter, isolated from the compartment of the housing enclosing the motor member in contact with the liquid to be measured. Also, so as to permit the transmission of the movement of the motor member to the counter through the separation wall, there is often used a magnetic transmission.

Thus, a first magnet, called a drive magnet, connected to the motor member drives in rotation, under the influence of the movement of the motor member, a second magnet, called a driven magnet, disposed on the first gear of the gear train of the counter. These magnets are disposed relative to each other such that the south pole of one corresponds to the north pole of the other and vice versa, so that a natural magnetic equilibrium will be obtained. Because of this, when the drive magnet is driven in rotation under the influence of movement of the motor member, the driven magnet tracks this movement so as to preserve the natural magnetic equilibrium, which actuates the gear train of the counter.

Other forms of magnetic coupling are also used. Thus, there is known from FR-A-2 280 060 a meter having a magnetic coupling constituted by a pair of oppositely polarized magnets positioned diametrically opposed on an axis perpendicular to the axis of the rotor of the turbine and a pair of oppositely polarized magnets also positioned diametrically opposed, connected to the meter. There is established between the pairs of magnets a magnetic equilibrium. Each magnet is constituted by two elemental magnets of the same polarity and each magnet thus has a single polarity on all its surfaces.

There is also known from FR-A-2 343 231, a volumetric measuring apparatus comprising a magnetic coupling constituted in part by a disc mounted on a shaft of the measuring member and about the periphery of which are disposed four magnets such that magnets of different polarity alternate with each other, the other portion of the magnetic coupling being identical. In this device, there therefore exist magnets having a single polarity over all their surfaces.

In FR-A-2 263 496, there is disclosed a magnetic coupling constituted of two discs whose facing surfaces have been magnetized with a number of pairs of poles. Thus, the disc has regions of single polarity.

It is also possible to use a third magnet similar to the preceding magnets and permitting actuating an electric contact during operation of the meter. In this case, the magnet is mounted on a movable portion of the counter whose rotation corresponds to one unit of volume of the liquid such that the successive passages of the south and north poles of this magnet will open and close the electrical contact, generally a flexible blade switch ("Reed switch") and designed to operate under the influence of a magnetic field. Electric impulses can also be remotely transmitted at the rhythm of flow of the liquid measured and, in particular, can thus control an electronic or teletransmission metering device.

In U.S. Pat. No. 5,493,917, there is disclosed the positioning of an electric impulse emitter by a magnet disposed on a needle of the indicator of a water meter.

However, the liquid meters of this type have a major drawback to the extent that the presence of an external magnet of sufficient power will disturb the operation of the meter.

Thus, in the case of a magnetic drive with a driving magnet and a driven magnet, each magnet of the magnetic drive has respectively four faces with double polarity and two faces of single polarity. Because of this, if an external magnet is brought close, a magnetic equilibrium will be preferentially established between the faces of single polarity of the magnets and the intruding magnet, which will block the meter.

In the case of other proposed forms of magnetic drive, the magnets which are all of a single polarity will establish a preferential magnetic equilibrium with an external magnet which blocks the meter.

SUMMARY OF THE INVENTION

So as to overcome this drawback, the present invention provides a liquid meter comprising a magnetic drive device whose natural magnetic equilibrium cannot be disturbed by an external magnet.

To this end, the invention has for its object a liquid meter, in particular a water meter, of the type comprising a housing having two separate sealed compartments comprising respectively a motor member disposed along the path of movement of the stream of liquid to be measured and a counter which, by demultiplication of a gear train, actuates an indicator comprised by numerical drums, the transmission of the movement of the motor member to the counter being carried out with the aid of a magnetic drive device comprising a magnet pair, the first magnet associated with the motor member having at least one face of double polarity in magnetic equilibrium with a face of double polarity of the second magnet associated with the counter, characterized in that each magnet has at least one double polarity on each of its other faces.

Preferably, the magnets have a parallelepipedal shape and are constituted of ferrite or rare earth.

Preferably, the magnets are constituted respectively by two assembled elemental bipolar magnets, the block thus obtained being adapted to have four contiguous faces having a double polarity and two faces opposed to each other having a quadruple polarity.

The magnets can also be made from four elemental magnets assembled.

The magnets can also be made of a single piece.

According to a first embodiment of the meter according to the invention, the magnetic drive device comprises at least one couple of magnets, the first so-called drive magnet associated with the motor member and the second so-called driven magnet associated with the counter being positioned to obtain a magnetic equilibrium under the force of their attraction.

Thus, the magnetic drive device comprises, for example, a couple of magnets in magnetic equilibrium, the first magnet associated with the motor member being mounted on the axis of rotation of the motor member so as to present one of its surfaces with double polarity in magnetic equilibrium with a surface with double polarity of the second magnet associated with the axis of a pinion of the counter, the north pole of the first magnet facing the south pole of the second magnet. The magnets are, as a result, in magnetic equilibrium under the force of their attraction and the driving in rotation of the first magnet associated with the motor member or again called the drive magnet, drives the rotation of the second so-called driven magnet. There can be provided several magnet couples in magnetic equilibrium under the force of their attraction.

According to a second embodiment of the meter according to the invention, the magnetic drive device comprises at least two couples of magnets. As described above, each couple of magnets has a first so-called drive magnet associated with a motor member and a second so-called driven magnet associated with the counter. So as to obtain magnetic equilibrium, the first magnets are positioned such that there arises with the second magnets a magnetic repulsion.

Thus, the drive magnets and the driven magnets are positioned such that each driven magnet is between two drive magnets, the drive magnets and the driven magnets having surfaces substantially in a same plane and identical poles on a driven magnet and a drive magnet being adjacent this plane.

Thus, the magnets are positioned such that each drive magnet is between two driven magnets, a surface with double polarity of a drive magnet thus being located substantially in the same plane as, and respectively between, a surface with double polarity of a first driven magnet and a surface with double polarity of a second driven magnet. Thus, the surfaces with double polarity are positioned in a same plane such that a pole of the surface with double polarity of a drive magnet is adjacent the identical pole of the surface of double polarity of the first driven magnet and the other pole of the drive magnet being adjacent the identical pole on the surface with double polarity of the second driven magnet.

The same is true for surfaces with quadruple polarity of the magnets which are disposed in a same plane.

This drive device permits avoiding the creation of axial pressure on the axles carrying the magnets. In this case, there is a considerable reduction of wear phenomena and friction, which generally impede the sensitivity of meters with magnetic transmission.

The magnets of a meter according to the invention have on each surface at least one double polarity, when an intruding magnet is brought into the vicinity of the meter according to the invention, the latter has no effect on the magnets of the magnetic drive device of the meter and this no matter what the position of the intruding magnet relative to the meter.

Thus, no matter what the polarity of the intruding magnet and its position, this latter will always be facing a surface of a magnet of the meter having at the same time at least two opposite poles. Because of this, the force of attraction which is exerted between the pole of the intruding magnet and the opposite pole of the surface of a magnet of the meter, is neutralized by the repulsive force between the pole of the intruding magnet and the same pole on the surface of the meter magnet.

As a result, an intruding magnet remains without influence on the magnets of the meter, thereby rendering impossible any fraud by blocking the magnetic drive of the meter.

In a meter according to the present invention, there can be provided a third magnet emplaced so as to actuate an electric contact during operation of the meter. Preferably, this magnet also has at least one double polarity on each of its faces.

Thus, preferably, the operation of this magnet cannot be blocked by an external magnet.

BRIEF DESCRIPTION OF THE DRAWINGS

There will now be described in greater detail an example of embodiment of a liquid meter according to the invention with reference to the accompanying drawing, in which.

DESCRIPTION OF THE PREFERRED EMBODIMENTS

Figure 1:
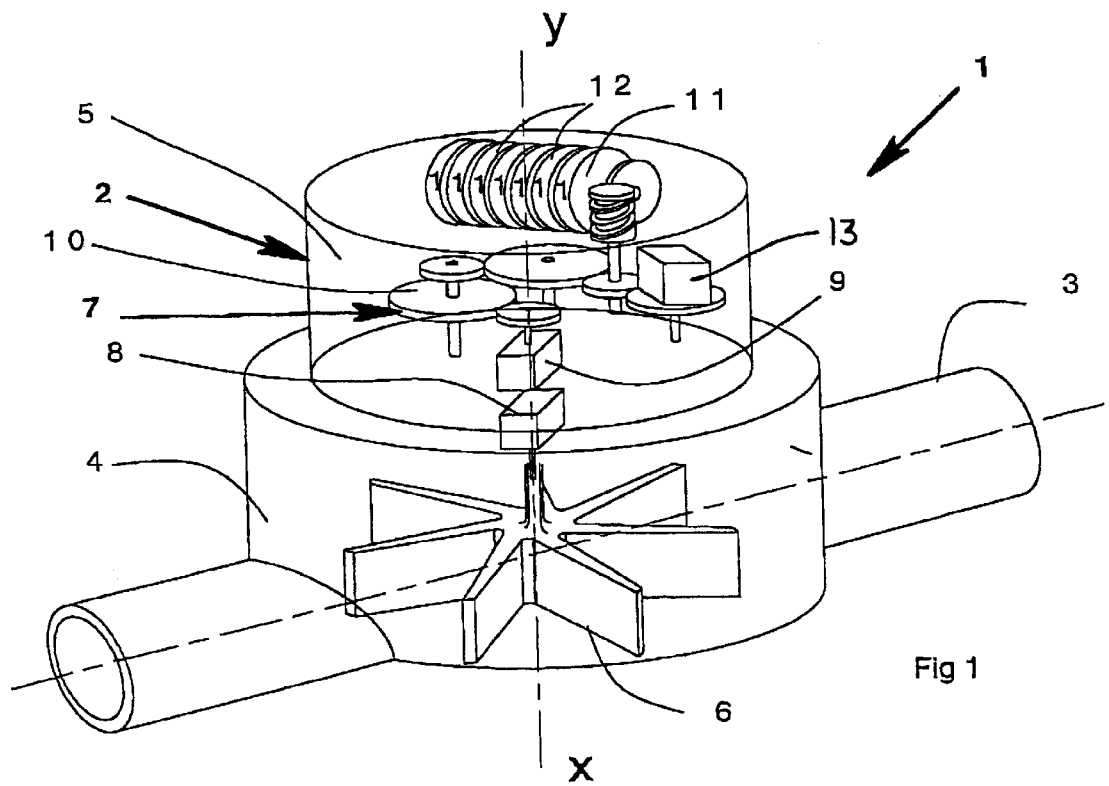
FIG. 1 is a schematic perspective view of a liquid meter whose walls are considered to be transparent.

For clarity of illustration, only the contours of the housing 2 of a meter 1 to which the invention can be applied and the flow 3 of liquid to be measured, are shown in FIG. 1.

A meter 1 comprises a housing 2 having two compartments 4 and 5 enclosing respectively a motor member such as a turbine 6 and a counter 7. The turbine 6 is disposed in the path of movement of the liquid of the flow 3 such that the turbine 6 is driven in rotation by the liquid.

So as to transmit the movement of the turbine 6 to the counter 7 through the sealed wall separating the compartment 4 from the compartment 5, there is used a magnetic drive device.

Thus, a magnet 8 is mounted on the axis of rotation X of the turbine 6 so as to have one face of double polarity confronting a face of double polarity of a magnet 9 mounted on the counter 7 such that the natural magnetic equilibrium is obtained, the north pole of the first magnet 8 being opposite the south pole of the second magnet 9 and vice versa.

Because of this, during liquid flow, the turbine 6 is driven in rotation and thus drives in rotation the magnet 8. So as to maintain the magnetic equilibrium, the magnet 9 is also driven in rotation and actuates a gear train 10 of the counter 7 whose demultiplication actuates an indicator 11 comprised generally by numerical drums 12.

Figure 2:
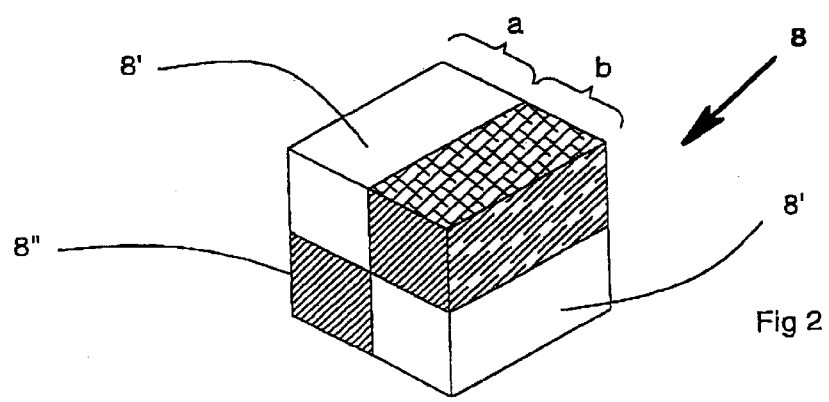
FIG. 2 shows a perspective view of a magnet used in a meter according to the invention.

Each magnet 8, 9 therefore has at least one face of double polarity and so as to avoid fraud, all the other faces of said magnets 8, 9 also have at least one double polarity as can be seen in FIG. 2.

Thus, preferably, each magnet 8, 9 is constituted of two elemental magnets with double polarity a, b, each magnet a, b having four faces with double polarity and two faces of single polarity. The magnets a and b are assembled, one double polarity face of a and one double polarity face of b being side by side with each other, the north pole (shown hatched) of the face of magnet a resting against the south pole of the face of magnet b, and vice versa.

Each magnet a, b can be obtained from two elemental magnets of opposite polarity.

Because of this, there is obtained for example a magnet 8 having four faces with double polarity 8' and two faces with quadruple polarity 8", as can be seen in FIG. 2.

Figure 3:
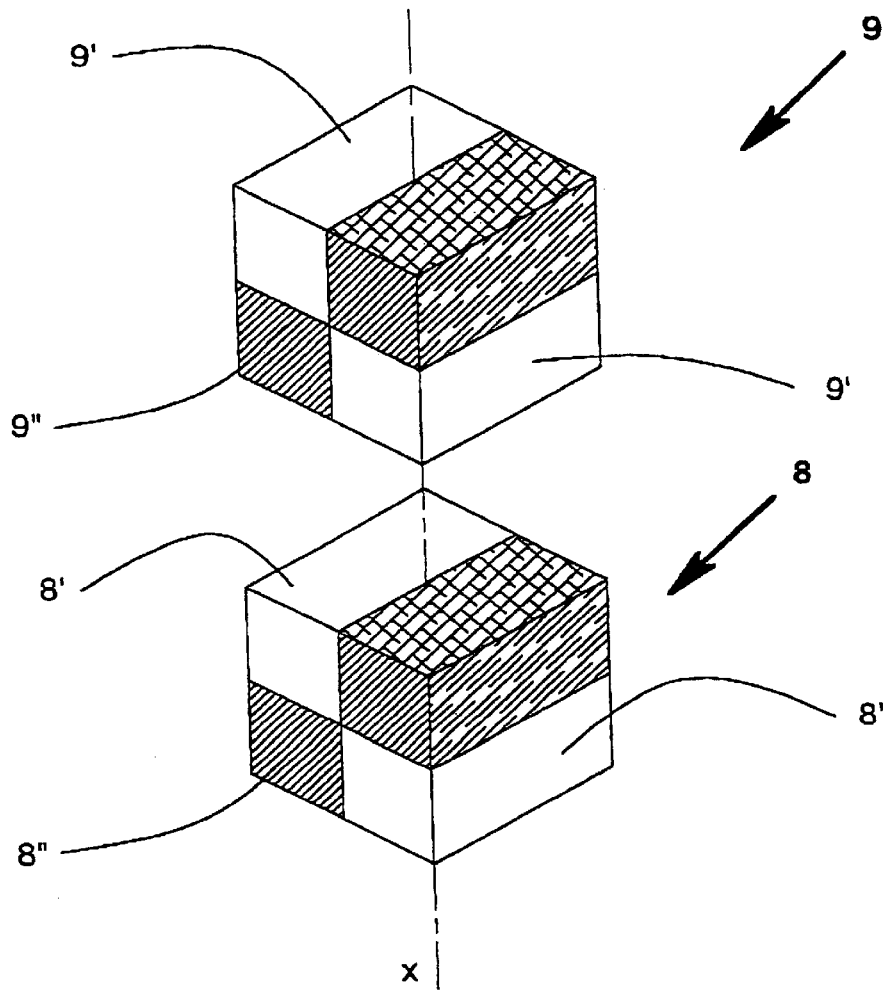
FIG. 3 is a perspective view of a magnetic drive device of a meter according to the invention according to FIG. 1.

In this way, the meter 1 according to the invention has two magnets 8 and 9 disposed confronting each other as can be seen in FIG. 3, one face with double polarity 8' of the magnet 8 facing a face with double polarity 9' of the magnet 9 such that the magnetic equilibrium is obtained.

The other faces of the magnets 8 and 9 being either with double polarity 8', 9' or with quadruple polarity 8", 9", the magnetic drive device cannot be disturbed by the presence of a magnet outside the housing, for fraudulent purposes.

Figure 4:
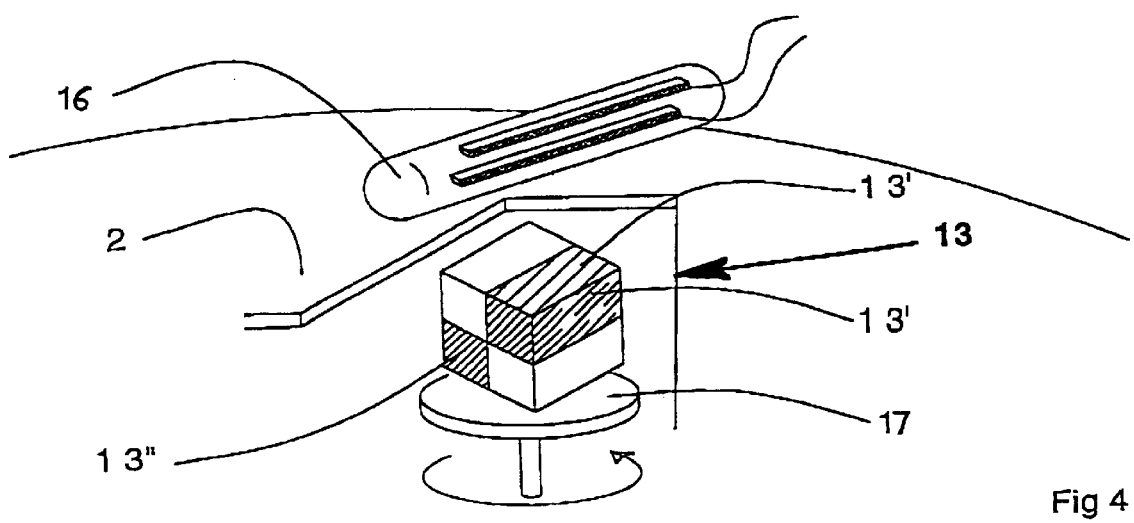
FIG. 4 is a fragmentary perspective view of a magnet for actuating an electric contact of the meter of FIG. 1, the housing of the meter having been partially broken away.

The meter 1 of FIG. 1 also comprises a magnet 13 permitting actuating an electric contact such as a flexible blade switch 16 (see FIG. 4) in the course of operation of the meter 1. This magnet 13 is mounted on a movable member 17 of the counter 7, one of its faces 13' with double polarity confronting the flexible blade switch 16.

In the course of operation of the meter 1, this magnet 13 is driven in rotation and the successive passage of the north poles (hatched) and south poles of said magnet 13 has the effect of opening and closing the flexible blade switch 16 designed to operate under the influence of a magnetic field.

The rotation of the magnet 13 is selected in accordance with a unit of volume of liquid, for example one turn per liter or per cubic meter. There can thus be transmitted electrical impulses at the rhythm of the flow of the liquid measured so as to actuate, for example, an electric meter device.

So as to avoid any fraud concerning the magnet 13, all the faces of this latter have at least one double polarity, the magnet 13 being of a structure identical to the structure of the magnets 8 and 9 and having faces 13' of double polarity and faces 13" of quadruple polarity.

Figure 5:
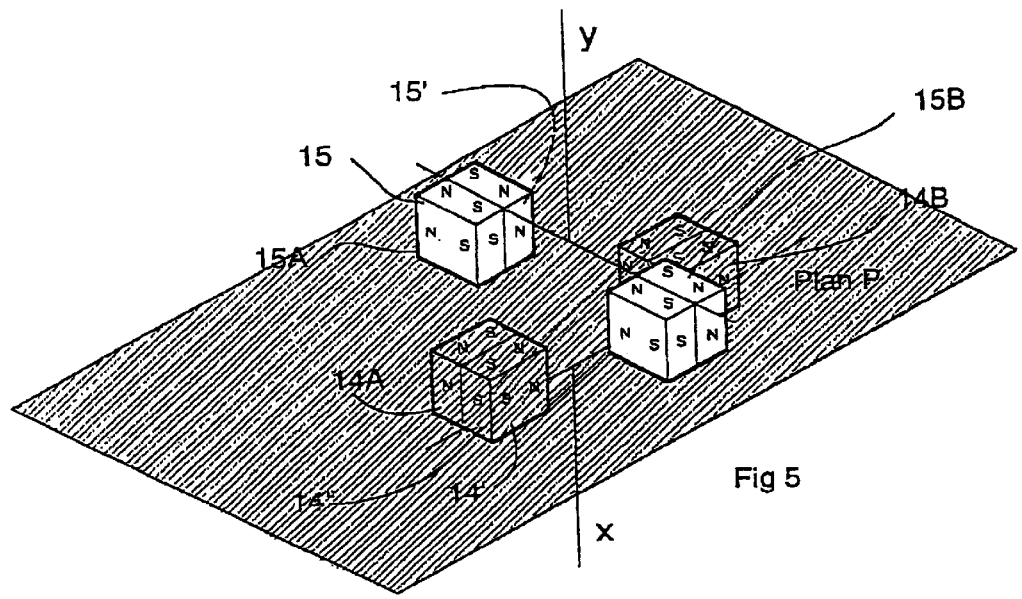
FIG. 5 shows a perspective view of a drive device according to a modification of the second embodiment of a meter according to the invention.

In FIG. 5 is shown a drive device according to a second embodiment of the invention. Two magnetic couples are used. Each couple comprises a first magnet 14 connected to the motor member 6 and a second magnet 15 associated with the counter 7, as a result, the drive device comprises two magnets 14a and 14b called drivers and two magnets 15a and 15b called driven, the first being mounted symmetrically on the axis of rotation X of the turbine 6 and the second being mounted symmetrically on an axis Y of the counter 7.

Figure 6:
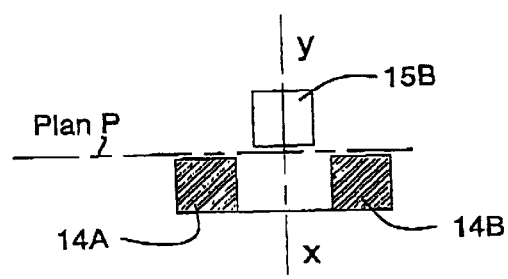
FIG. 6 is a side view of a drive device according to FIG. 5.

The magnets 14a and 14b are positioned substantially between the magnets 15a and 15b as is shown in FIGS. 5 and 6 and such that the lower surfaces of the magnets 15a and 15b and the upper surfaces of the magnets 14a and 14b are located substantially in a same plane P. So as to obtain magnetic equilibrium, the first magnets 14a and 14b are positioned such that they give rise, with the second magnets 15a and 15b, to a magnetic repulsion at the level of this plane P, which is to say that the identical poles of the first magnet 14a or 14b and of a second magnet 15a or 15b are adjacent to each other so as to repel.

Magnets 14a and 14b are positioned so as to present a surface with double polarity (modification shown in FIG. 7) or with quadruple polarity (modification shown in FIG. 5) adjacent a surface with double or quadruple polarity of the magnets 15a and 15b such that a pole of the magnet 14a is adjacent an identical pole of the magnet 15a and the second pole of the magnet 14a is adjacent the identical pole of the magnet 15b. The same is true for magnet 14b.

Figure 7:
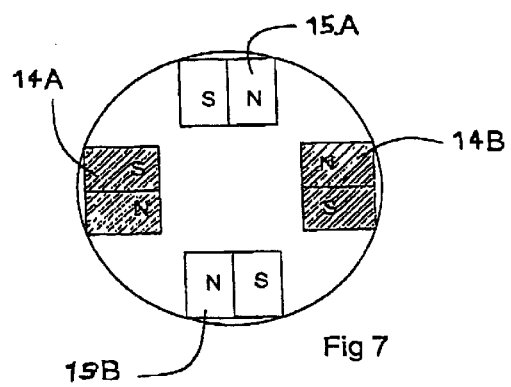
FIG. 7 shows schematically the arrangement of the adjacent polarities of the magnets of the device according to a modification of FIG. 5 at the level of a plane P.

As a result, identical poles of magnet 14a and magnet 15a adjacent each other repel as do identical poles on the magnet 14a and the magnet 15b. There is thus established a magnetic equilibrium due to the repulsion which exists between the magnets 14a, 14b and 15a, 15b, as can be seen in FIG. 7, which shows the adjacent polarities substantially in the same plane P, giving rise to the phenomenon of repulsion.

There is thus created a stable magnetic equilibrium, and when the magnets 14a and 14b are driven in rotation by the axle X of the turbine 6, there are also driven the magnets 15a and 15b of the counter 7 so as to preserve this magnetic equilibrium.

The magnets 14 and 15 having all their surfaces with at least one double polarity, are of the same type as the magnets 8 and 9, which is to say that they have, for example, four faces 14', 15' with double polarity and two opposite surfaces 14", 15" with quadruple polarity, such that an external magnet is inactive.

Figure 8:
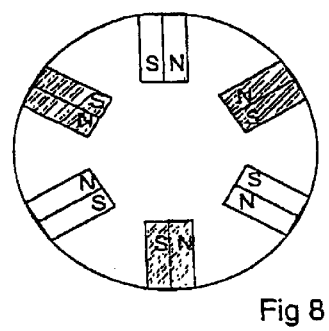
FIGS. 8 and 9 show schematically the arrangement of the polarities, at the level of a plane P, of the magnets of modifications of the magnetic drive device according to the second embodiment of the invention.
Figure 9:
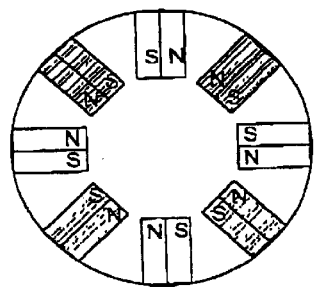

FIGS. 8 and 9 show respectively drive devices with three and four magnetic couples in which the magnetic equilibrium between the drive and driven magnets is obtained by the same phenomenon of magnetic repulsion.

What is claimed is:

1. Liquid meter, in particular a water meter, of the type comprising a housing (2) having two compartments (4, 5) comprising respectively a motor member (6) disposed in the path of movement of a flow (3) of the liquid to be measured and a counter (7) which, by demultiplication of a gear train (10), actuates an indicator (11) comprised by numerical drums (12), the transmission of the movement of the motor member (6) to the counter (7) being effected through a separation wall of the compartments (4, 5) with the aid of a magnetic drive device comprising a pair of magnets (8, 9), a first of said pair of magnets (8) associated with the motor member (6) having at least one face with double polarity (8') in magnetic equilibrium with a face of double polarity (9') of a second of said pair of magnets (9) associated with the counter (7), wherein each magnet (8, 9) has at least one double polarity on each of its other faces (8', 8", 9', 9").

2. Meter according to claim 1, wherein the magnets (8; 9) have a parallelepipedal shape and are constituted of ferrite or rare earths.

3. Meter according to claim 1, wherein the magnets (8; 9) are constituted respectively by two elemental bipolar magnets (a, b), the magnets (8; 9) having four contiguous faces (8'; 9') having double polarity and two faces (8"; 9") opposite each other having quadruple polarity.

4. Meter according to claim 3, wherein each bipolar magnet is constituted by two elemental magnets of opposite polarity.

5. Meter according to claim 1, further comprising a magnet (13) having six faces permitting actuating an electrical contact in the course of operation of the meter (1), all said six faces of said magnet (13) having at least a double polarity.

6. Meter according to claim 5, wherein the counter comprises a movable member and the magnet (13) is mounted on the movable member (17) of the counter (7), the magnet having a face with a double polarity (13'), said face confronting a flexible blade switch (16).

7. Meter according to claim 5, wherein said electrical contact is a flexible blade switch.

8. Meter according to claim 1, wherein the first of said pair of magnets associated with the motor member (6) is mounted on an axis of rotation of the motor member (6) so as to present a surface with double polarity in magnetic equilibrium with a surface of double polarity of the second of said pair of magnets (9) associated with an axle of a pinion of the counter (7).

9. Meter according to claim 1, wherein the first of said pair of magnets comprises plural drive magnets, each of said plural drive magnets being associated with the motor member (6) and the second of said pair of magnets comprising plural driven magnets, each of said plural driven magnets being associated with the counter (7), each of said plural drive magnets being positioned to give rise to a magnetic repulsion with a corresponding one of said plural driven magnets.

10. Meter according to claim 9, wherein each of the plural drive and plural driven magnets are positioned such that each one of said plural driven magnets is located approximately equidistance from two of said plural drive magnets, the plural drive magnets and the plural driven magnets having surfaces substantially in a same plane and the identical poles of said plural drive magnets and said plural driven magnets being adjacent this plane.

11. Meter according to claim 9, wherein each one of said plural drive magnets (14a, 14b) is located approximately equidistance from two of said plural driven magnets (15a, 15b), a surface with double polarity of one of said each plural drive magnet (14a, 14b) being thus located substantially in a same plane as, and between, a surface with double polarity of a first one of said plural driven magnets and a surface with double polarity of a second of said plural driven magnets, the surfaces with double polarity being positioned such that a pole of the surface with double polarity of said one plural drive magnet (14a, 14b) is adjacent the identical pole of the surface with double polarity of the first one of said plural driven magnets (15a) and the other pole of the surface with double polarity of the one plural drive magnet (14a, 14b) being adjacent the identical pole on the surface with double polarity of the second one of said plural driven magnet (15b).

12. Meter according to claim 9, wherein each of said plural drive magnets (14a, 14b) is located approximately equidistance from two of said plural driven magnets (15a, 15b), a surface with quadruple polarity of a one of said each plural drive magnet (14a, 14b) being thus located substantially in a same plane as and between a surface with quadruple polarity of a first one of said plural driven magnets and a surface with quadruple polarity of a second one of said plural driven magnets, the surfaces with quadruple polarity being positioned such that a pole of the surface with quadruple polarity of said one plural drive magnet (14a, 14b) is adjacent the identical pole of the surface with quadruple polarity of the first one of said plural driven magnets (15a) and the other pole of the surface with quadruple polarity of the one plural drive magnet (14a, 14b) being adjacent the identical pole on the surface with quadruple polarity of the second one of said plural driven magnets (15b).

\* \* \* \* \*